(12) United States Patent
Son et al.

(10) Patent No.: US 8,971,534 B2
(45) Date of Patent: Mar. 3, 2015

(54) MOBILE COMMUNICATION TERMINAL AND METHOD

(71) Applicant: Electronics and Telecommunications Research Institute, Daejeon (KR)

(72) Inventors: Jong-Mok Son, Daejeon (KR);
Dong-Wook Lee, Daejeon (KR);
Jae-Hwan Ahn, Daejeon (KR);
Yong-Ick Chung, Daejeon (KR);
Yong-Seok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 196 days.

(21) Appl. No.: 13/671,337

(22) Filed: Nov. 7, 2012

(65) Prior Publication Data

US 2013/0156192 A1 Jun. 20, 2013

(30) Foreign Application Priority Data

Dec. 14, 2011 (KR) .......................... 10-2011-0134855

(51) Int. Cl.
*H04K 1/00* (2006.01)
(52) U.S. Cl.
USPC .............................. 380/270; 380/255; 380/259
(58) Field of Classification Search
CPC ..... H04W 4/14; H04W 12/02; H04L 63/0435

USPC ........................................... 380/270, 255, 259
See application file for complete search history.

(56) References Cited

U.S. PATENT DOCUMENTS

| 5,227,613 | A | * | 7/1993 | Takagi et al. | .................. 235/380 |
| 2007/0101122 | A1 | * | 5/2007 | Guo | ................................ 713/153 |
| 2007/0203839 | A1 | * | 8/2007 | Terauchi et al. | ................. 705/51 |
| 2007/0234034 | A1 | | 10/2007 | Leone et al. | |
| 2009/0044007 | A1 | | 2/2009 | Ferrazzini et al. | |
| 2011/0244830 | A1 | | 10/2011 | Chesnutt et al. | |

FOREIGN PATENT DOCUMENTS

| JP | 2006-287858 A | 10/2006 |
| KR | 10-2002-0075472 A | 10/2002 |
| KR | 10-2011-0055091 A | 5/2011 |

* cited by examiner

*Primary Examiner* — Baotran N To
(74) *Attorney, Agent, or Firm* — LRK Patent Law Firm

(57) ABSTRACT

A mobile communication terminal used in wideband code division multiple access (WCDMA) 3G mobile communication includes: a communication terminal unit configured to receive a short text message from a user and transmit encrypted data generated by encrypting the short text message; and a secure-universal subscriber identity module (S-USIM) unit configured to generate a session key for encrypting the short text message, when receiving a request to encrypt the short text message from a communication terminal unit.

12 Claims, 4 Drawing Sheets

MOBILE COMMUNICATION TERMINAL AND METHOD

CROSS-REFERENCE TO RELATED APPLICATIONS

This application claims priority to Korean Patent Application No. 10-2011-0134855, filed on Dec. 14, 2011, which is incorporated herein by reference in its entirety.

BACKGROUND OF THE INVENTION

1. Technical Field

Exemplary embodiments of the present invention relate to a mobile communication terminal and method and, particularly, to a mobile communication terminal and method which utilizes a universal subscriber identity module (USIM) as a security token to protect short text messages transmitted and received between mobile communication terminals, without changing an existing mobile communication network.

2. Description of the Related Art

Recently, the current communication environment focused on wired communication networks has been reorganized into a wireless communication network, because the wireless communication network provides easy network accessibility and communication under a mobile environment. In particular, with recent technology developments, service quality has been improved. Furthermore, as smart phones have become common, the number of users who use wideband code division multiple access (WCDMA) 3G mobile communication has rapidly increased.

In the WCDMA 3G mobile communication, it is difficult for a third party to access communication data in a wireless channel, due to the characteristics of CDMA communication. However, when the information of a mobile communication terminal is known, communication data may be accessed by a third party in a wireless channel. In particular, since data are transmitted as a plain text in units other than the wireless channel, communication data are vulnerable to access by a third party. Therefore, in order to protect short text messages transmitted through the WCDMA 3G mobile communication network, end-to-end security is necessary for the transmission of these messages between a transmission-side terminal and a reception-side terminal.

Furthermore, in the WCDMA 3G mobile communication, subscriber information is stored in a USIM. That is since a subscriber is identified based on a USIM, a user may easily replace a mobile communication terminal by installing the USIM containing the subscriber's information in another mobile communication terminal.

SUMMARY OF THE INVENTION

An embodiment of the present invention is directed to a mobile communication terminal and method which is capable of protecting short text messages transmitted and received between mobile communication terminals without changing the existing mobile communication network. That is, the embodiment of the present invention provides end-to-end cryptographal security, when a short text message is transmitted and received between the mobile communication terminals.

Another embodiment of the present invention is directed to a mobile communication terminal and method which mounts a key management function for encrypting a short text message and an encryption/decryption function into a USIM and utilizes the USIM as a security token. Accordingly, the embodiment of the present invention improves the entire communication security and management efficiency in a communication utilizing mobile communication terminals.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a mobile communication terminal used in WCDMA 3G mobile communication includes: a communication terminal unit configured to receive a short text message from a user and transmit encrypted data generated by encrypting a short text message; and a secure-universal subscriber identity module (S-USIM) unit configured to generate a session key for encrypting the short text message, when receiving a request to encrypt the short text message from the communication terminal unit.

The S-USIM unit may receive the short text message from the communication terminal unit, generate the encrypted data by encrypting the short text message using the session key, and transmit the encrypted data to the communication terminal unit. The S-USIM unit may transmit a random number generated by the session key to the communication terminal unit, upon receiving a request to encrypt the short text message from the communication terminal unit, and the communication terminal unit may generate the encrypted data by encrypting the short text message using the random number.

The communication terminal unit may transmit terminal information of the communication terminal unit and the telephone number of a communication terminal to receive the encrypted data to the S-USIM unit, when transmitting the request to encrypt the short text message, and the S-USIM unit may generate a session key based on information of the S-USIM unit, the terminal information, and the telephone number information.

The communication terminal unit may also transmit information of the S-USIM unit and terminal information of the communication terminal unit, when transmitting the encrypted data.

In accordance with another embodiment of the present invention, a mobile communication terminal used in WCDMA 3G communication includes: a communication terminal unit configured to receive encrypted data generated by encrypting a short text message from a transmission-side communication terminal, and display the short text message generated by decrypting the encrypted data to a user; and an S-USIM unit configured to generate a session key for decrypting the encrypted data, when receiving a request to decrypt the encrypted data from the communication terminal unit.

The S-USIM unit may receive the encrypted data from the communication terminal unit, generate the short text message by decrypting the encrypted data using the session key, and transmit the short text message to the communication terminal unit.

The S-USIM unit may transmit a random number generated by the session key to the communication terminal unit, when receiving a request to decrypt the encrypted data from the communication terminal unit, and the communication terminal unit may generate the short text message by decrypting the encrypted data using the random number.

The communication terminal unit may also receive information of a transmission-side S-USIM unit and terminal information of the transmission-side communication terminal, when receiving the encrypted data from the transmission-side communication terminal.

The communication terminal unit may transmit the information of the transmission-side S-USIM unit and the terminal information of the transmission-side communication terminal to the S-USIM unit, and the S-USIM unit may set the session key based on the information of the transmission-side S-USIM unit and the terminal information of the transmission-side communication terminal.

In accordance with another embodiment of the present invention, a mobile communication method in WCDMA 3G communication includes: inputting, by a user, a short text message to a transmission-side communication terminal; requesting, by the transmission-side communication terminal, an S-USIM unit to generate a session key for encrypting the short text message; generating, by the S-USIM unit, the session key; generating encrypted data by encrypting the short text message using the session key; and transmitting, by the transmission-side communication terminal, the encrypted data to a reception-side communication terminal.

The generating of the encrypted data by encrypting the short text message using the session key may include: generating, by the S-USIM unit receiving the short text message from the transmission-side communication terminal, the encrypted data by encrypting the short text message using the session key; and transmitting, by the S-USIM unit, the encrypted data to the transmission-side communication terminal.

The generating of the encrypted data by encrypting the short text message using the session key may include: transmitting, by the S-USIM unit, a random number generated by the session key to the transmission-side communication terminal; and generating, by the transmission-side communication terminal, the encrypted data by encrypting the short text message using the random number.

In requesting the S-USIM unit to generate a session key for encrypting the short text message, the transmission-side communication terminal may transmit terminal information of the transmission-side communication terminal and the telephone number of the reception-side communication terminal to the S-USIM unit, when transmitting the request to generate the session key, and in generating the session key, the S-USIM unit may generate the session key based on information of the S-USIM unit, the terminal information of the transmission-side communication terminal, and the telephone number information of the reception-side communication terminal.

In the transmitting of the encrypted data to the reception-side communication terminal, the transmission-side communication terminal may also transmit information of the S-USIM unit and terminal information of the transmission-side communication terminal to the reception-side communication terminal, when transmitting the encrypted data.

In accordance with another embodiment of the present invention, a mobile communication method in WCDMA 3G communication includes: receiving, by a reception-side communication terminal, encrypted data generated by encrypting a short text message from a transmission-side communication terminal; requesting, by the reception-side communication terminal, an S-USIM unit to generate a session key for decrypting the encrypted data; generating, by the S-USIM unit, the session key; generating the short text message by decrypting the encrypted data using the session key; and displaying the short text message to a user.

Generating the short text message by decrypting the encrypted data using the session key may include: generating, by the S-USIM unit receiving the encrypted data from the reception-side communication terminal, the short text message by decrypting the encrypted data using the session key; and transmitting, by the S-USIM unit, the short text message to the reception-side communication terminal.

The generating of the short text message by decrypting the encrypted data using the session key may include: transmitting, by the S-USIM unit, a random number generated by the session key to the reception-side communication terminal; and generating, by the reception-side communication terminal, the short text message by decrypting the encrypted data using the random number.

In the receiving of the encrypted data generated by encrypting the short text message from the transmission-side communication terminal, the reception-side communication terminal may also receive information of a transmission-side S-USIM unit and terminal information of the transmission-side communication terminal from the transmission-side communication terminal, when receiving the encrypted data.

In the requesting of the S-USIM unit to generate the session key for decrypting the encrypted data, the reception-side communication terminal may transmit the information of the transmission-side S-USIM unit and the terminal information of the transmission-side communication terminal to the S-USIM unit, when transmitting the request to generate the session key, and in the generating of the session key, the S-USIM unit may generate the session key based on the information of the transmission-side S-USIM unit and the terminal information of the transmission-side communication terminal.

DESCRIPTION OF SPECIFIC EMBODIMENTS

Figure 1:
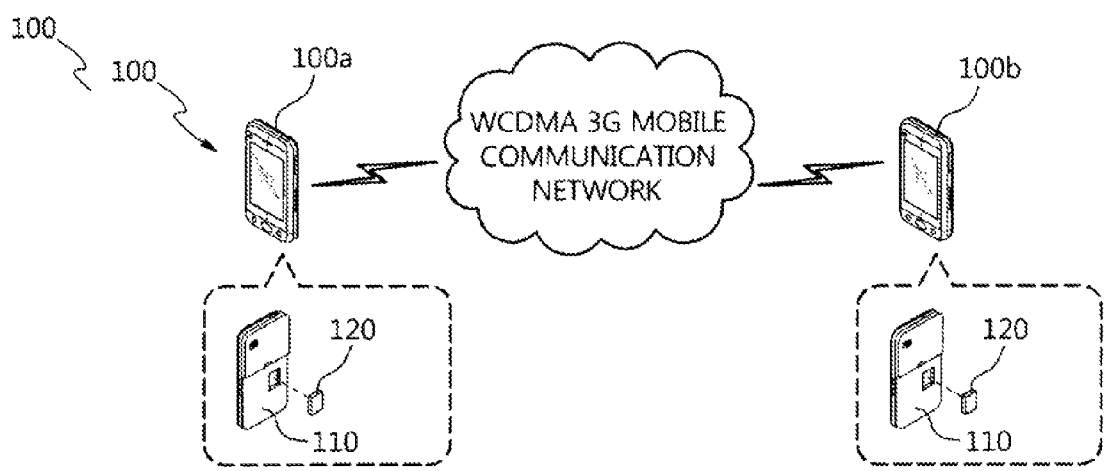
FIG. 1 is a schematic view illustrating a WCDMA 3G communication network to which a mobile communication terminal in accordance with an embodiment of the present invention is applied.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, a mobile communication terminal in accordance with an embodiment of the present invention will be described.

Figure 2:
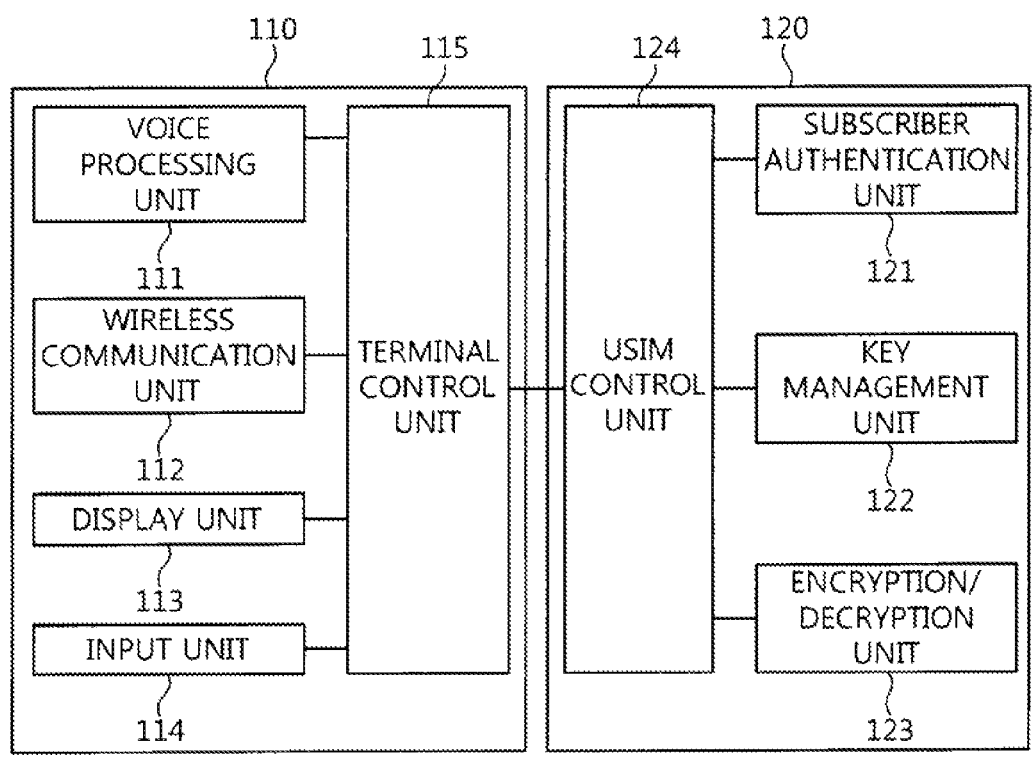
FIG. 2 is a block diagram illustrating the configuration of the mobile communication terminal in accordance with the embodiment of the present invention.

FIG. 1 is a schematic view illustrating a WCDMA 3G communication network to which the mobile communication terminal in accordance with the embodiment of the present invention is applied. FIG. 2 is a block diagram illustrating the configuration of the mobile communication terminal in accordance with the embodiment of the present invention.

Referring to FIG. 1, the mobile communication terminal 100 in accordance with the embodiment of the present invention is connected to the WCDMA 3G mobile communication network. The mobile communication terminal 100 may include a first mobile communication terminal 100a transmitting a text message and a second mobile communication terminal 100b receiving the text message transmitted from the first mobile communication terminal 100a. At this time, the first and second mobile communication terminal 100a and 100b have different names depending on the situation in which the text message is transmitted or received, but have the same configuration. That is, each of the first and second mobile communication terminals 100a and 100b includes a communication terminal unit 110 and a secure-USIM (S-USIM) unit 120.

Referring to FIG. 2, the configurations and operations of the communication terminal unit 110 and the S-USIM unit 120 will be described as follows.

The communication terminal unit 110 may include a voice processing unit 111, a wireless communication unit 112, a display unit 113, an input unit 114, and a terminal control unit 115. The voice processing unit 111 is configured to recognize the voice of a user. The display unit 113 is configured to display a text message or the like. The input unit 114 serves as an input unit for a user to input a text message. The terminal control unit 115 is configured to control the voice processing unit 111, the wireless communication unit 112, the display unit 113, and the input unit 114. Furthermore, the terminal control unit 115 is connected to a USIM control unit 124 of the S-USIM unit 120, and configured to exchange data with the USIM control unit 124.

The S-USIM unit 120 includes a subscriber authentication unit 121, a key management unit 122, an encryption/decryption unit 123, and the USIM control unit 124. The subscriber authentication unit 121 is configured to store information of a user using the communication terminal unit 110, in order to identify a universal subscriber. The key management unit 122 is configured to search for a user key for encrypting/decrypting a short text message and set the user key. The encryption/decryption unit 123 is configured to generate a session key for encrypting/decrypting the short text message using the user key of the key management unit 122. The USIM control unit 124 controls the subscriber authentication unit 121, the key management unit 122, and the encryption/decryption unit 123. Furthermore, the USIM control unit 124 is connected to the terminal control unit 115 of the communication terminal unit 110 and configured to exchange data with the terminal control unit 115.

Hereinafter, the operations of the communication terminal unit 110 and the S-USIM unit 120 when the mobile communication terminal 100 transmits a short text message will be described in detail. That is, the following descriptions will be focused on the operations of the respective units when the mobile communication terminal 100 operates as a transmission-side communication terminal.

The input unit 114 receives a short text message from a user. The terminal control unit 115 transmits the received short text message to the USIM control unit 124 of the S-USIM unit 120, and requests encryption of the short text message. At this time, the terminal control unit 115 transmits information of the S-USIM unit 120, unique terminal information of the communication terminal unit 110, and the telephone number of a communication terminal to receive the short text message, to the USIM control unit 124.

Then, the key management unit 122 searches for a user key for encryption based on the information of the S-USIM unit 120, the unique terminal information, and the telephone number information, which are received by the USIM control unit 124, and sets the user key. The encryption/decryption unit 123 generates a session key for encrypting the short text message, using the information of the S-USIM unit 120, the unique terminal information, and the telephone number information, which are received by the USIM control unit 124, and the user key set by the key management unit 122. The encryption/decryption unit 123 generates encrypted data by encrypting the short text message using the generated session key. That is, in the mobile communication terminal 100 in accordance with the embodiment of the present invention, the S-USIM unit 120 just encrypts the short text message. The encrypted data generated by the encryption/decryption unit 123 is transmitted to the terminal control unit 115 through the USIM control unit 124. Furthermore, the encrypted data is transmitted to a reception-side communication terminal through the wireless communication unit 112 of the communication terminal unit 110. At this time, the terminal control unit 115 may also transmit the information of the S-USIM unit 120 and the unique terminal information of the communication terminal unit 110 transmitting the encrypted data to the reception-side communication terminal, when transmitting the encrypted data.

Hereinafter, the operations of the communication terminal unit 110 and the S-USIM unit 120 when the mobile communication terminal 100 receives an encrypted short text message, i.e., encrypted data will be described in detail. That is, the following descriptions will be focused on the operations of the respective units when the mobile communication terminal 100 operates as a reception-side communication terminal.

The wireless communication unit 112 of the communication terminal unit 110 receives an encrypted short text message, i.e., encrypted data from the transmission-side communication terminal. At this time, the communication terminal unit 110 may also receive the information of the transmission-side S-USIM unit and unique terminal information of the transmission-side communication terminal, when receiving the encrypted data.

The terminal control unit 115 transmits the encrypted data to the USIM control unit 124 of the S-USIM unit 120 and requests decryption of the encrypted data. At this time, the terminal control unit 115 transmits the information of the transmission-side S-USIM unit and the unique terminal information of the transmission-side communication terminal to the USIM control unit 124.

Then, the key management unit 122 searches for a user key for encryption based on the information of the transmission-side S-USIM unit and the unique terminal information of the transmission-side communication terminal, which are received by the USIM control unit 124, and sets the user key. The encryption/decryption unit 123 generates a session key for decrypting the short text message, using the information of the transmission-side S-USIM unit and the unique terminal information of the transmission-side communication terminal, which are received by the USIM control unit 124, and the user key set by the key management unit 122. The encryption/decryption unit 123 generates a short text message by decrypting the encrypted data using the generated session key. That is, in the mobile communication terminal 100 in accordance with the embodiment of the present invention, the S-USIM unit 120 just decrypts the encrypted data. The short text message generated by the encryption/decryption unit 123 is transmitted to the terminal control unit 115 through the USIM control unit 124. The short text message is displayed to the user through the display unit 113 of the terminal control unit 115.

Hereinafter, a mobile communication terminal in accordance with another embodiment of the present invention will be described.

Figure 3:
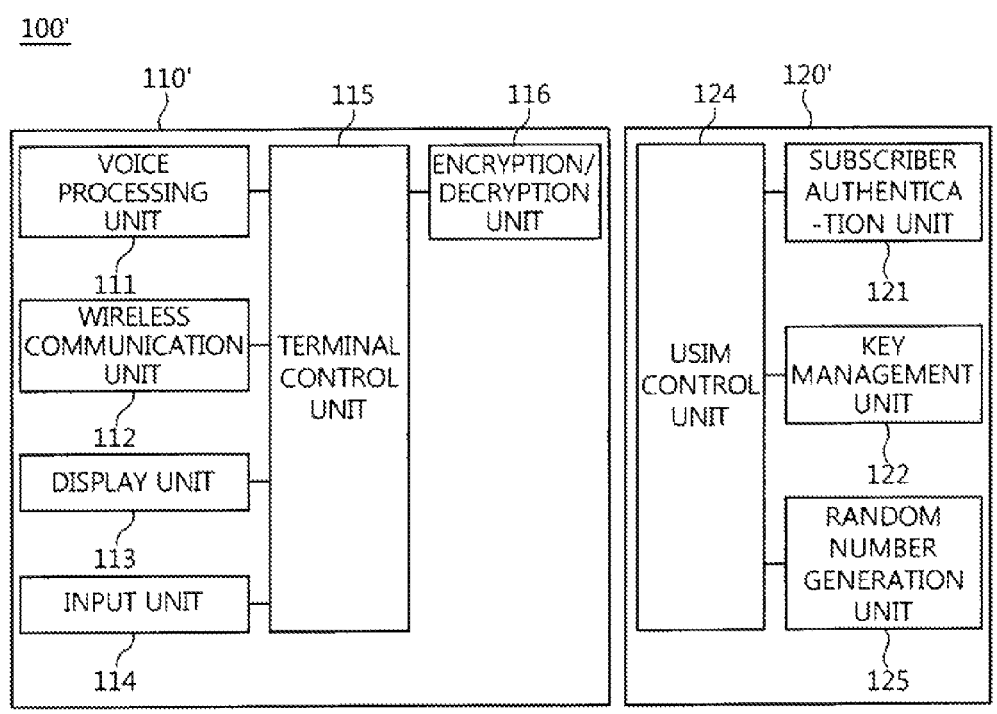
FIG. 3 is a block diagram illustrating a mobile communication terminal in accordance with another embodiment of the present invention.

FIG. 3 is a block diagram illustrating a mobile communication terminal in accordance with another embodiment of the present invention.

Referring to FIG. 3, the mobile communication terminal 100 in accordance with the embodiment of the present invention includes an encryption/decryption unit 116 and a random number generation unit 125 which are configured in a different manner from the mobile communication terminal 100 of FIG. 2. Accordingly, the following descriptions will be focused on the encryption/decryption unit 116 and the random number generation unit 125 of the mobile communication terminal 100' in accordance with the embodiment of the present invention. Furthermore, like reference numerals will be given to the same components as those of the mobile communication terminal 100 of FIG. 2, and the detailed descriptions will be omitted.

In the mobile communication terminal 100 of FIG. 2, the encryption of a short text message and the decryption of encrypted data are performed by the S-USIM unit 120. However, in the mobile communication terminal 100' in accordance with embodiment of the present invention, the encryption of a short text message and the decryption of encrypted data are performed by the communication terminal unit 110'.

More specifically, when the USIM control unit 124 is requested to encrypt a short text message by the terminal control unit 115, the key management unit 122 searches for a user key for encryption, based on information of the S-USIM unit 120', unique terminal information of the communication terminal unit 110', and telephone number information, which are received by the USIM control unit 124, and sets the user key. The random number generation unit 125 generates a session key for encrypting the short text message, using the information of the S-USIM unit 120', the unique terminal information of the communication terminal unit 110', and the telephone number information, which are received by the USIM control unit 124, and the user key set by the key management unit 122. Then, the random number generation unit 125 generates a random, number using the session key, and transmits the generated random number to the terminal control unit 115 through the USIM control unit 125.

The encryption/decryption unit 116 of the communication terminal unit 110' generates encrypted data by encrypting the short text message using the random number transmitted to the terminal control unit 115. That is, in the mobile communication terminal 100' in accordance with the embodiment of the present invention, the communication terminal unit 110' just encrypts the short text message.

Furthermore, when the USIM control unit 124 is requested to decrypt encrypted data by the terminal control unit 115, the key management unit 122 searches for a user key for encryption based on information of the transmission-side S-USIM unit and unique terminal information of the transmission-side communication terminal, which are received by the USIM control unit 124, and sets the user key. The random number generation unit 125 generates a session key for decrypting the encrypted data using the information of the transmission-side S-USIM unit and the unique terminal information of the transmission-side communication terminal, which are received by the USIM control unit 124, and the user key set by the key management unit 122. Then, the random number generation unit 125 generates a random number using the session key, and transmits the generated random number to the terminal control unit 115 through the USIM control unit 124.

The encryption/decryption unit 116 of the communication terminal unit 110' generates a short text message by decrypting the encrypted data using the random number transmitted to the terminal control unit 115. That is, in the mobile communication terminal 100' in accordance with the embodiment of the present invention, the communication terminal unit 110' just decrypts the encrypted data.

Hereinafter, a mobile communication method in accordance with another embodiment of the present invention will be described.

Figure 4:
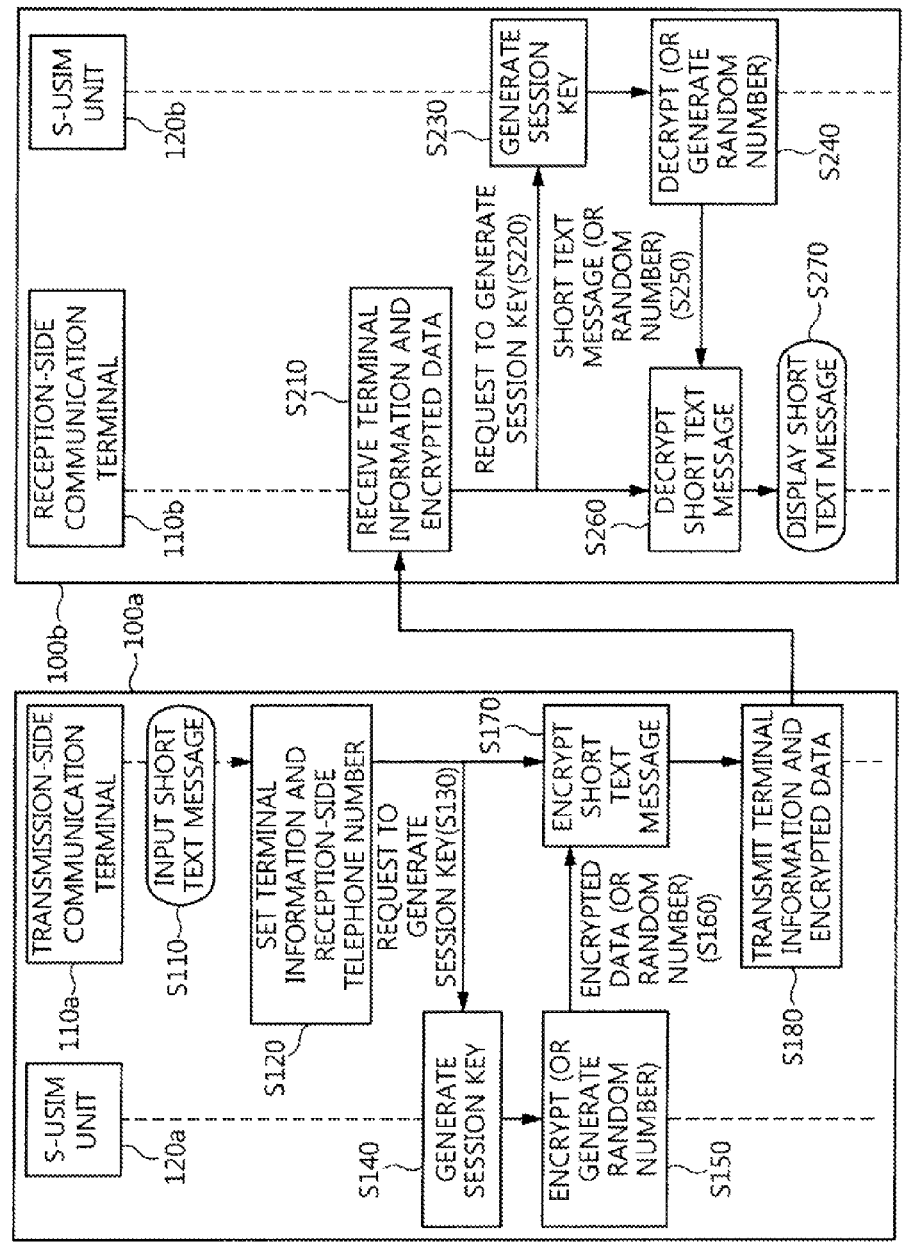
FIG. 4 is a flow chart explaining a mobile communication method in accordance with another embodiment of the present invention.

FIG. 4 is a flow chart explaining the mobile communication method in accordance with the embodiment of the present invention.

FIG. 4 shows a case in which a first mobile communication terminal 100a including a transmission-side communication terminal 110a and an S-USIM unit 120a transmits a short text message to a second mobile communication terminal 100a including a reception-side communication terminal 110a and an S-USIM unit 120b. At this time, the first and second mobile communication terminals 100a and 100b may include the mobile communication terminal of FIG. 2 or 3. That is, the transmission-side communication terminal 100a and the reception-side communication terminal 100b correspond to the communication terminal unit of the mobile communication terminal of FIG. 2 or 3, and the S-USIM units 120a and 120b correspond to the S-USIM unit of the mobile communication terminal of FIG. 2 or 3.

The mobile communication method for encrypting a short text message in accordance with the embodiment of the present invention is performed as follows. First, the transmission-side communication terminal 110a receives a short text message from a user at step S110.

The transmission-side communication terminal 110a stores and sets information of the S-USIM unit 120a, unique terminal information of the transmission-side communication terminal 110a, and a telephone number of the reception-side communication terminal 110b at step S120.

Then, the transmission-side communication terminal 110a requests the S-USIM unit 120a to encrypt the short text message at step S130. More specifically, the transmission-side communication terminal 110a requests the S-USIM unit 120a to generate a session key for encrypting the short text message. At step S130, the transmission-side communication terminal 110a transmits the unique terminal information of the transmission-side communication terminal 110a and the telephone number of the reception-side communication terminal 110v to the S-USIM unit 120a.

Then, the S-USIM unit 120a generates a session key at step S140. At this time, the S-USIM unit 120a generates the session key based on the information of the S-USIM unit 120a, the unique terminal information of the transmission-side communication terminal 110a, and the telephone number in formation of the reception-side communication terminal 110h.

The S-USIM unit 120a encrypts the short text message using the session key generated at step S140 and generates encrypted data, at step S150. Alternatively, at step S150, the S-USIM unit 120a generates a random number using the session key generated at step S140.

Then, the S-USIM unit 120a transmits the encrypted data to the transmission-side communication terminal 110a at step S160. Alternatively, the S-USIM unit 120a transmits the random number generated at step S150 to the transmission-side communication terminal 110a.

When the S-USIM unit 120a transmits the random number to the transmission-side communication terminal 110a at step S160, the transmission-side communication terminal 110a encrypts the short text message using the random number at step S170.

Then, the encrypted data generated at step S150 or S170 is transmitted to the reception-side communication terminal 110b at step S180. At step S180, the information of the S-USIM unit 120a and the unique terminal information of the transmission-side communication terminal 110a are also transmitted to the reception-side communication terminal 110b, when the encrypted data is transmitted.

The mobile communication method for decrypting the encrypted data in accordance with the embodiment of the present invention is performed as follows. First, the reception-side communication terminal 110h receives the encrypted data from the transmission-side communication terminal 110a at step S210. At step S210, the reception-side communication terminal 110b also receives the information of the S-USIM unit 120a and the unique terminal information of the transmission-side communication terminal 110a from the transmission-side communication terminal 110a, when receiving the encrypted data.

The reception-side communication terminal 110b requests the S-USIM unit 120b to decrypt the encrypted data at step S220. More specifically, the reception-side communication terminal 110b requests the S-USIM unit 120b to generate a session key for decrypting the encrypted data. At step S220, the reception-side communication terminal 110b transmits the information of the S-USIM unit 120a and the unique terminal information of the transmission-side communication terminal 110a to the S-USIM unit 120b.

The S-USIM unit 120b generates a session key at step S230. At this time, the S-USIM unit 120b generates the session key based on the information of the S-USIM unit 120a and the unique terminal information of the transmission-side communication terminal 110a.

The S-USIM unit 120b decrypts the encrypted data using the session key generated at step S230, and generates a short text message at step S240. Alternatively, at step S240, the S-USIM unit 120b generates a random number using the session key generated at step S230.

Then, the S-USIM unit 120b transmits the short text message to the reception-side communication terminal 110b at step S250. Alternatively, the S-USIM unit 120b transmits the random number generated at step S240 to the reception-side communication terminal 110b.

When the S-USIM unit 120b transmits the random number to the reception-side communication terminal 110b at step S250, the reception-side communication terminal 110b decrypts the short text message using the random number at step S260.

The short text message generated at step S240 or S260 is displayed to a user through the display unit at step S270.

The mobile communication terminal and method in accordance with the embodiments of the present invention are not limited to the configurations of the above-described embodiments, but a part or all of the respective embodiments may be selectively combined so that various modifications may be made.

In accordance with the embodiments of the present invention, it is possible to protect a short text message transmitted and received between mobile communication terminals without changing an existing mobile communication network. That is, the embodiments of the present invention may provide end-to-end cryptographal security, when the short text message is transmitted and received between the mobile communication terminals.

Furthermore, the key management function for encrypting a short text message and the encryption/decryption function may be mounted into a USIM and the USIM may be utilized as a security token. Accordingly, the embodiments of the present invention may improve the entire communication security and management efficiency in a communication utilizing mobile communication terminals.

While the present invention has been described with respect to the specific embodiments, it will be apparent to those skilled in the art that various changes and modifications may be made without departing from the spirit and scope of the invention as defined in the following claims.

What is claimed is:

1. A mobile communication terminal used in wideband code division multiple access (WCDMA) 3G mobile communication, comprising:
   a first communication terminal unit configured to receive a short text message from a user and transmit encrypted data generated by encrypting the short text message; and
   a first secure-universal subscriber identity module (S-USIM) unit configured to generate a first session key for encrypting the short text message, when receiving a request to encrypt the short text message from the first communication terminal unit,
   wherein the first communication terminal unit transmits terminal information of the first communication terminal unit and a telephone number of a second communication terminal unit to receive the encrypted data to the first S-USIM unit, when transmitting the request to encrypt the short text message,
   wherein the first communication terminal unit also transmits information of the first S-USIM unit and the terminal information of the first communication terminal unit, when transmitting the encrypted data, and
   wherein the first S-USIM unit is configured to generate the first session key based on information of the first S-USIM unit, information of the first communication terminal unit and the telephone number of the second communication terminal unit.

2. The mobile communication terminal of claim 1, wherein the first S-USIM unit receives the short text message from the first communication terminal unit, generates the encrypted data by encrypting the short text message using the first session key, and transmits the encrypted data to the first communication terminal unit.

3. The mobile communication terminal of claim 1, wherein the first S-USIM unit transmits a random number generated by the first session key to the first communication terminal unit, when receiving the request to encrypt the short text message from the first communication terminal unit, and
   the first communication terminal unit generates the encrypted data by encrypting the short text message using the random number.

4. A mobile communication terminal used in WCDMA 3G communication, comprising:
   a second communication terminal unit configured to receive encrypted data generated by encrypting a short text message from a first communication terminal, and display the short text message generated by decrypting the encrypted data to a user; and
   a second S-USIM unit configured to generate a second session key for decrypting the encrypted data, when receiving a request to decrypt the encrypted data from the second communication terminal unit, the encrypted data encrypted by a first S-USIM unit with a first session key based on information of the first S-USIM unit, information of the first communication terminal and a telephone number of the second communication terminal, wherein the second communication terminal unit also receives information of the first S-USIM unit and terminal information of the first communication terminal, when receiving the encrypted data from the first communication terminal, wherein the second communication terminal unit transmits the information of the first S-USIM unit and the terminal information of the first communication terminal to the second S-USIM unit, and wherein the second S-USIM unit generates the second session key based on the information of the first S-USIM unit and the terminal information of the first communication terminal.

5. The mobile communication terminal of claim 4, wherein the second S-USIM unit receives the encrypted data from the second communication terminal unit, generates the short text message by decrypting the encrypted data using the second session key, and transmits the short text message to the second communication terminal unit.

6. The mobile communication terminal of claim 4, wherein the second S-USIM unit transmits a random number generated by the second session key to the second communication terminal unit, when receiving a request to decrypt the encrypted data from the second communication terminal unit, and the second communication terminal unit generates the short text message by decrypting the encrypted data using the random number.

7. A mobile communication method in WCDMA 3G communication, comprising:

inputting, by a user, a short text message to a first communication terminal unit;

requesting, by the first communication terminal unit, a first S-USIM unit to generate a first session key for encrypting the short text message;

generating, by the first S-USIM unit, the first session key;

generating encrypted data by encrypting the short text message using the first session key; and transmitting, by the first communication terminal unit, the encrypted data to a second communication terminal unit, wherein, in the requesting, by the first communication terminal unit, the first S-USIM unit to generate a first session key for encrypting the short text message, the first communication terminal unit transmits terminal information of the first communication terminal unit and a telephone number of the second communication terminal unit to the first S-USIM unit, wherein, in the transmitting, by the first communication terminal unit, the encrypted data to the second communication terminal unit, the first communication terminal unit also transmits information of the first S-USIM unit and the terminal information of the first communication terminal unit to the second communication terminal unit, and wherein the first S-USIM unit is configured to generate the first session key based on the information of the first S-USIM unit, the information of the first communication terminal unit and the telephone number of the second communication terminal unit.

8. The mobile communication method of claim 7, wherein the generating the encrypted data by encrypting the short text message using the first session key comprises:

generating, by the first S-USIM unit receiving the short text message from the first communication terminal, the encrypted data by encrypting the short text message using the first session key; and transmitting, by the first S-USIM unit, the encrypted data to the first communication terminal unit.

9. The mobile communication method of claim 7, wherein the generating the encrypted data by encrypting the short text message using the first session key comprises:

transmitting, by the first S-USIM unit, a random number generated by the first session key to the first communication terminal unit; and generating, by the transmission-side communication terminal, the encrypted data by encrypting the short text message using the random number.

10. A mobile communication method in WCDMA 3G communication, comprising:

receiving, by a second communication terminal, encrypted data generated by encrypting a short text message from a first communication terminal;

requesting, by the second communication terminal, a second S-USIM unit to generate a second session key for decrypting the encrypted data;

generating, by the second S-USIM unit, the second session key;

generating the short text message by decrypting the encrypted data using the second session key, the encrypted data encrypted by a first S-USIM unit with a first session key based on information of a first S-USIM unit, information of the first communication terminal unit and a telephone number of the second communication terminal unit; and displaying the short text message to a user, wherein the second communication terminal unit also receives information of the first S-USIM unit and the terminal information of the first communication terminal unit, when receiving the encrypted data from the first communication terminal, wherein the second communication terminal unit transmits the information of the first S-USIM unit and the terminal information of the first communication terminal unit to the second S-USIM unit, and wherein the second S-USIM unit generates the second session key based on the information of the first S-USIM unit and the terminal information of the first communication terminal unit.

11. The mobile communication method of claim 10, wherein the generating the short text message by decrypting the encrypted data using the second session key comprises:

generating, by the S-USIM unit receiving the encrypted data from the second communication terminal unit, the short text message by decrypting the encrypted data using the second session key; and transmitting, by the second S-USIM unit, the short text message to the second communication terminal unit.

12. The mobile communication method of claim 10, wherein the generating the short text message by decrypting the encrypted data using the second session key comprises:

transmitting, by the second S-USIM unit, a random number generated by the second session key to the second communication terminal unit; and generating, by the second communication terminal unit, the short text message by decrypting the encrypted data using the random number.

* * * * *